United States Patent [19]
Greenwood et al.

[11] Patent Number: 5,829,472
[45] Date of Patent: Nov. 3, 1998

[54] DUAL CONTAINED PURGE CONNECTION FOR DUAL CONTAINMENT VALVES

[75] Inventors: Peter J. Greenwood, Cheshire; Benedict J. Aliano, Oxford, both of Conn.

[73] Assignee: Carten Controls Inc., Cheshire, Conn.

[21] Appl. No.: 905,534

[22] Filed: Aug. 4, 1997

[51] Int. Cl.⁶ .................................................. F16K 51/00
[52] U.S. Cl. ........................... 137/312; 137/377; 251/331
[58] Field of Search ................................... 251/331, 148, 251/152; 137/343, 377, 312; 73/40.5 R, 46

[56] References Cited

U.S. PATENT DOCUMENTS

| | | | |
|---|---|---|---|
| 4,370,997 | 2/1983 | Braithwaite et al. | 137/377 X |
| 4,867,201 | 9/1989 | Carten | 251/331 X |
| 5,228,472 | 7/1993 | Ougiya et al. | 137/312 |
| 5,232,016 | 8/1993 | Chun | 251/148 X |
| 5,615,700 | 4/1997 | Chaney et al. | 137/312 X |

OTHER PUBLICATIONS

Drawing by SAES Pure Gas, Inc., dated 1992.
DCS Series brochure by Carten Controls Inc., dated 1996.

*Primary Examiner*—Kevin Lee
*Attorney, Agent, or Firm*—John H. Crozier

[57] ABSTRACT

In a preferred embodiment, a dual contained purge connection for a dual containment valve, the valve having a body with inlet and outlet passageways and primary and secondary flow paths defined therein, the purge connection including: a purge fitting fixedly attached to the body and in communication with the primary flow path; and a housing having a closed distal end, surrounding the purge fitting, and having a proximal end removably attached to the body, an interior volume of the housing external to the purge fitting and surrounding the purge fitting being in communication with the secondary flow path.

8 Claims, 3 Drawing Sheets

DUAL CONTAINED PURGE CONNECTION FOR DUAL CONTAINMENT VALVES

BACKGROUND OF THE INVENTION

1. Field of the Invention.

The present invention relates to fluid flow valves generally and, more particularly, but not by way of limitation, to a novel dual containment valve having an integral dual contained purge connection.

2. Background Art.

Dual containment valves are employed in applications where containment, cleanliness, and purity are of the utmost importance. These valves are typically springless, packless, diaphragm valves for controlling the passage of gas or solvent through a primary tube, while providing a complete secondary containment flow path through the valve, surrounding any possible leakage path from the primary flow path. The secondary flow path remains open regardless of the primary passage being open or closed. Typically, the secondary path is connected to a vacuum source to ensure the removal of any material leaking from the primary path, but the secondary line pressure can instead exceed the primary line pressure, if desired, to keep moisture and other foreign materials from leaking into the primary path. Such a valve is described, for example, in U.S. Pat. No. 4,867,201, issued Sep. 19, 1989, and titled PARALLEL-MOTION DUAL-DIAPHRAGM VALVE.

Often it is desirable to provide a purge connection in the system for purging the primary path, obtaining a sample, or the like. Conventionally, the means for this is accomplished by attaching a purge connection to the tubing in the primary path spaced apart from the diaphragm valve. The purge connection is surrounded by a closed housing the interior of which is connected to the secondary path. This arrangement requires additional fabrication in the field and also creates a "dead zone" in the primary flow path extending between the valve body and the purge connection.

It would be desirable to have a dual contained purge connection that is an integral part of the main valve, so as to eliminate the additional labor and the dead zone associated with the conventional arrangement.

Accordingly, it is a principal object of the present invention to provide a dual containment valve with an integral dual contained purge.

It is a further object of the invention to provide such a dual containment valve that is economical to construct.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a dual contained purge connection for a dual containment valve, said valve having a body with inlet and outlet passageways and primary and secondary flow paths defined therein, said purge connection comprising: purge tubing fixedly attached to said body and in communication with said primary flow path; and a housing having a closed distal end, surrounding said purge tubing, and having a proximal end removably attached to said body, an interior volume of said housing external to said purge tubing and surrounding said purge tubing being in communication with said secondary flow path.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
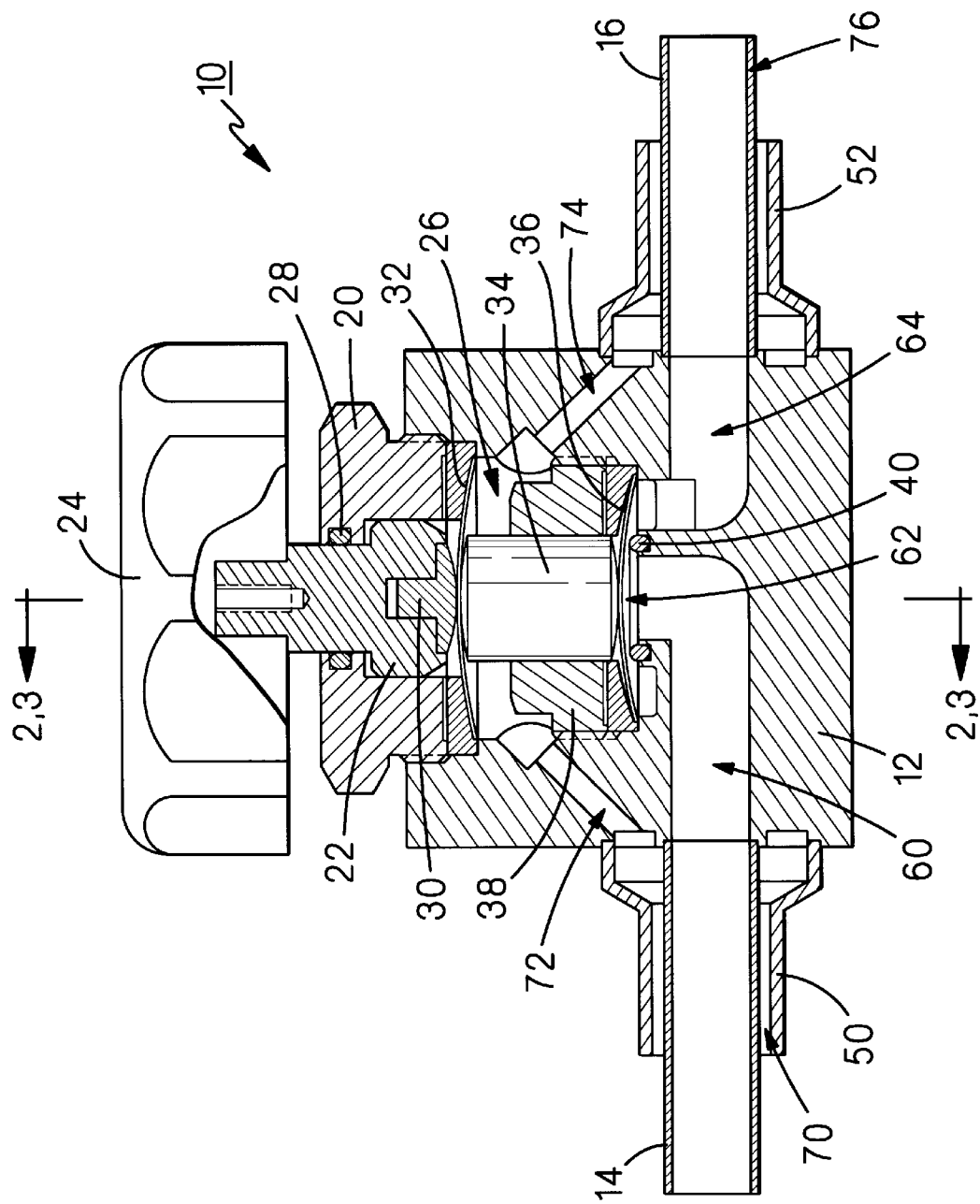
FIG. 1 is a front side elevational view, partially cut-away and partially in cross-section, of a diaphragm valve constructed according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a dual containment diaphragm valve, constructed according to the present invention, and generally indicated by the reference numeral 10. While valve 10, for purposes of this description, illustrates a valve including the present invention, this particular cross-sectional view could also be of a dual containment diaphragm valve without the inclusion of the present invention.

Valve 10 includes a body 12, to which are attached at opposite ends of the body, inlet and outlet primary tubes 14 and 16, respectively. An upper bonnet nut 20 threadedly attached to body 12 threadedly holds therein a stem 22 at the distal end of which is fixedly attached a handlewheel 24 which may be turned to raise or lower the stem within the upper bonnet nut. Upper bonnet nut 20 and stem 22 close a hollow cylindrical channel 26 defined in body 12. An O-ring 28 disposed between upper bonnet nut 20 and stem 22 is provided for sealing purposes.

An inverted mushroom shaped stem insert 30 attached to the lower end of stem 22 bears against the upper surface of an upper diaphragm 32. The lower surface of upper diaphragm 32 bears against the upper end of a pusher 34 the lower end of which bears against the upper surface of a lower diaphragm 36. Pusher 34 is moveable upwardly and downwardly within a lower bonnet nut 38 which is threadedly attached to the inner surface of channel 26. A seat insert 40 is disposed in body 12 underneath lower diaphragm 36.

Inlet and outlet tubes 14 and 16 are surrounded, respectively, by secondary inlet and outlet tubes 50 and 52, respectively. It will be understood that, when valve 10 is installed, additional primary tubing will be attached to inlet and outlet primary tubes 14 and 16 and that extensions of inlet and outlet secondary tubes 50 and 52 will extend along the full length of primary tubes 14 and 16 and any additional primary tubing in the system of which the valve is a part.

A primary flow path is provided by the interior of primary inlet tube 14, a primary inlet flow passageway 60 defined in body 12, an open space 62 defined underneath the lower surface of lower diaphragm 36, a primary outlet flow passageway 64 defined in body 12, and the interior of primary outlet tube 16. A secondary flow path is provided by an annular space 70 defined between the inner surface of secondary inlet tube 50 and the outer surface of primary inlet tube 14, a secondary inlet flow passageway 72 defined in body 12, a portion of channel 26 underneath upper diaphragm 32, a secondary outlet flow passageway 74 defined in body 12, and an annular space 76 defined between the inner surface of secondary outlet tube 52 and the outer surface of primary outlet tube 16.

Valve 10 is shown on FIG. 1 as being in the "open" position, that is, with space 62 providing communication between primary inlet passageway 60 and primary outlet passageway 64. To move valve 10 to its "closed" position, handlewheel 24 is rotated, causing stem 22 to advance into body 12. This causes stem insert 30 to push against the upper surface of upper diaphragm 32 which causes the lower surface of the upper diaphragm to push against the upper end of pusher 34, the lower end of the pusher to push against the upper surface of lower diaphragm 36 and the diaphragm to eventually seal against seat insert 40, thus closing space 62 to close and shut off communication between primary inlet passageway 60 and primary outlet passageway 64. A position between "open" and "closed" will cause valve 10 to throttle flow therethrough.

It is to be noted that the vertical separation between the lower surface of upper diaphragm 32 and the upper end of lower bonnet nut 38 is great enough that the open portion of channel 26 lying therebetween, and thus the secondary flow path, will remain open even when the primary flow path is shut off. Upper diaphragm 32 seals the secondary flow path against leakage through the top of channel 26.

Figure 2:
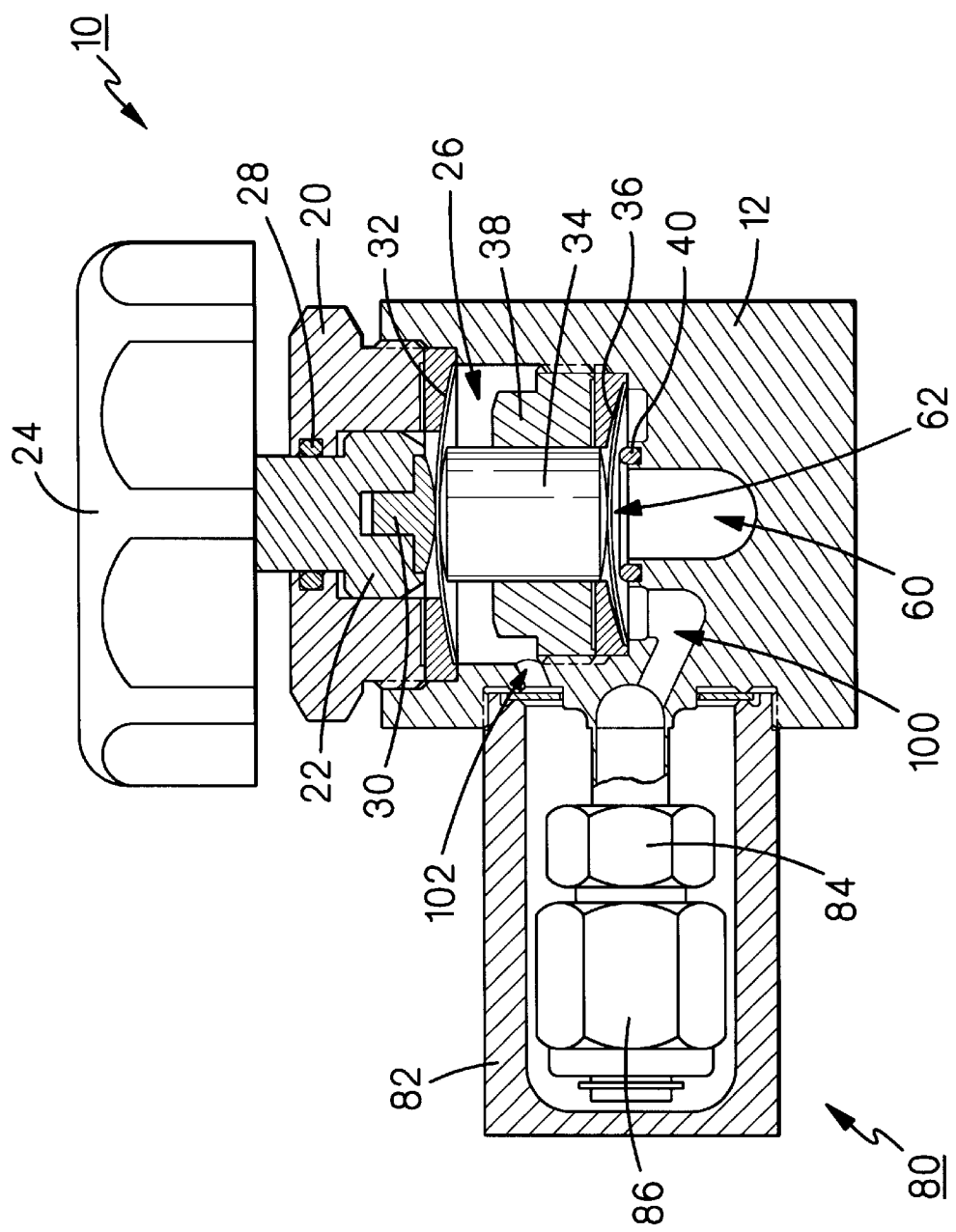
FIG. 2 is a right side elevational view, partially cutaway and partially in cross-section, taken along line "2—2" of FIG. 1.
Figure 3:
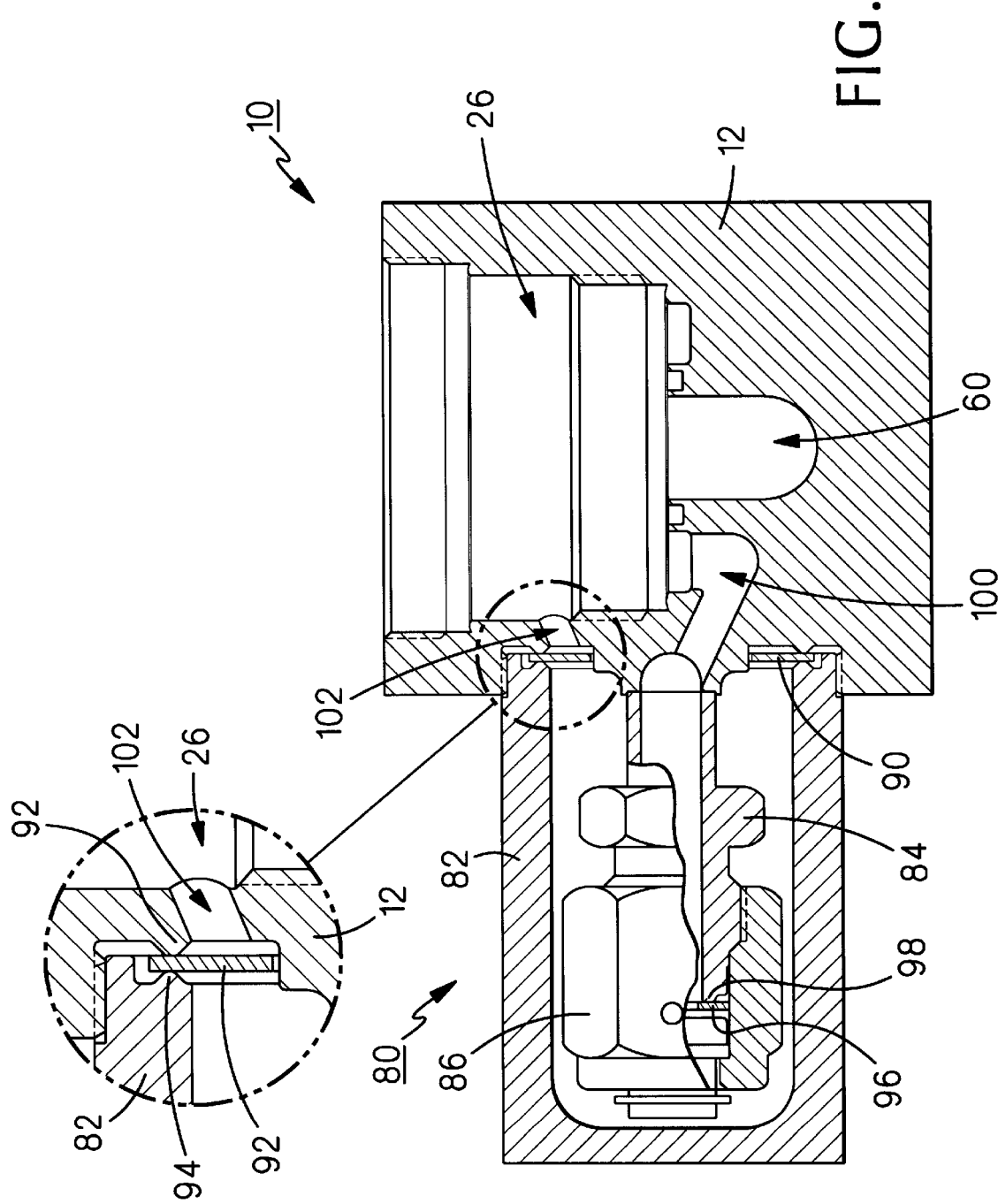
FIG. 3 is a fragmentary, right side elevational view, partially cutaway and partially in cross-section, taken along line "3—3" of FIG. 1.

FIG. 2 further illustrates that a portion of the secondary flow path is disposed between the primary flow path and the upper end of channel 26 such that any leakage from the primary flow path internally of body 12 will flow into the secondary flow path. FIG. 3 more clearly illustrates the form of channel 26, with the internal components of valve 10 removed.

FIGS. 2 and 3 also illustrate a dual contained purge assembly generally indicated by the reference numeral 80. Purge assembly 80 includes a hexagonal shaped housing 82, having a cylindrical central bore, and having its distal end closed and its proximal open end threadedly attached to the side of body 12 with a left handed thread, the latter feature being provided for safety reasons. Disposed within housing 82 is a purge fitting 84 welded to body 12, to the distal end of which purge fitting is threadedly attached a purge cap 86 to close the end of the purge fitting. Purge cap 86 may be removed and purging or sampling equipment (neither shown) attached to purge fitting 84. A first nickel gasket 90 is sealingly disposed between an annular ridge 92 formed (FIG. 3) on body 12 and an annular ridge 94 formed around a proximal surface of housing 80. A second nickel gasket 96 (FIG. 3) is sealingly disposed between purge cap 86 and an annular ridge 98 formed around the distal end of purge fitting 84.

The interior of purge fitting 84 communicates with primary outlet passageway 64 through a purge passageway 100 defined in body 12 and extending between the purge fitting and primary outlet passageway 64 (FIG. 1). The interior volume of housing 82 external to purge fitting 84 and purge cap 86 communicates with the secondary flow path through a passageway 102 defined in body 12 and extending between the housing and the portion of channel 26 beneath upper diaphragm 32.

It can be seen that not only is the primary flow path completely surrounded by the secondary flow path, but the purge connection is also completely surrounded by the secondary flow path. Thus, any leakage from any source in the primary flow path must necessarily flow into the secondary flow path. Furthermore, the remaining "dead zone" in the primary flow path consists of only the very short purge passageway 100. In addition, contained purge assembly 80 is economically fabricated with valve 10 in the manufacturing operation and no additional fabrication with respect thereto is required in the field.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. A dual contained purge connection for a dual containment valve, said valve having a body with inlet and outlet passageways and primary and secondary flow paths defined therein, said purge connection comprising:

(a) a purge fitting fixedly attached to said body and in communication with said primary flow path; and (b) a housing having a closed distal end, surrounding said purge fitting, and having a proximal end removably attached to said body, an interior volume of said housing external to said purge fitting and surrounding said purge fitting being in communication with said secondary flow path.

2. A dual contained purge connection, as defined in claim 1, wherein: said purge fitting is in communication with a primary outlet passageway in said primary flow path.

3. A dual contained purge connection, as defined in claim 1, wherein: said housing is threadedly attached to a side of said body.

4. A dual contained purge connection, as defined in claim 2, further comprising: a purge cap closing a distal end of said purge fitting and threadedly attached thereto.

5. A dual contained purge connection, as defined in claim 3, further comprising: a first metallic gasket sealingly disposed between an annular ridge formed on said body and an annular ridge formed around a distal end of said housing.

6. A dual contained purge connection, as defined in claim 4, further comprising: a second metallic gasket sealingly disposed between an inner surface of said purge cap and an annular ridge formed around said distal end of said purge fitting.

7. A dual contained purge connection, as defined in claim 5, wherein: said first metallic gasket is a nickel gasket.

8. A dual contained purge connection, as defined in claim 6, wherein: said second metallic gasket is a nickel gasket.

\* \* \* \* \*